(12) United States Patent
Rao et al.

(10) Patent No.: US 11,069,206 B2
(45) Date of Patent: Jul. 20, 2021

(54) METHODS AND APPARATUS FOR OUTPUTTING A HAPTIC SIGNAL TO A HAPTIC TRANSDUCER

(71) Applicant: Cirrus Logic International Semiconductor Ltd., Edinburgh (GB)

(72) Inventors: Harsha Rao, Austin, TX (US); Kyle Wilkinson, South Lake Tahoe, CA (US); Rong Hu, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/280,256

(22) Filed: Feb. 20, 2019

(65) Prior Publication Data

US 2019/0340895 A1 Nov. 7, 2019

Related U.S. Application Data

(60) Provisional application No. 62/667,009, filed on May 4, 2018, provisional application No. 62/670,325, filed on May 11, 2018.

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC ... G06F 3/01; G06F 3/016; G08B 6/00; A63F 13/24; A63F 13/285; A61H 31/00;
(Continued)

(56) References Cited

U.S. PATENT DOCUMENTS 3,686,927 A  8/1972 Scharton
4,902,136 A  2/1990 Mueller et al.
(Continued)

FOREIGN PATENT DOCUMENTS

AU  2002347829  4/2003
CN  103165328 A  6/2013
(Continued)

OTHER PUBLICATIONS

International Search Report and Written Opinion of the International Searching Authority, International Application No. PCT/GB2019/051189, dated Jul. 2, 2019.
(Continued)

*Primary Examiner* — Van T Trieu
(74) *Attorney, Agent, or Firm* — Jackson Walker L.L.P.

(57) ABSTRACT

Embodiments described herein provide methods and apparatus for outputting a haptic signal to a haptic transducer. A method comprises storing a representation of a part of the haptic signal comprising a first information point indicating a first amplitude and at least one first frequency of the part of the haptic signal at a first time, wherein the representation is associated with a user experience; responsive to receiving an indication of occurrence of the user experience, determining the haptic signal based on the first information point such that the part of the haptic signal has the first amplitude and the at least one first frequency at the first time. The method may further comprise outputting the haptic signal to the haptic transducer.

48 Claims, 5 Drawing Sheets

Responsive to receiving an indication of occurrence of a user experience, generate a first part of haptic signal based on a stored representation of the first part of the haptic signal comprising information relating to a first amplitude of the first part of haptic signal. — 501

Generate a second part haptic signal based on a stored representation of the second part of the haptic signal comprising information relating to a second amplitude of the second part of haptic signal. — 502

(58) Field of Classification Search
CPC ...... A61H 31/006; A61H 31/02; H04L 12/18;
H04L 12/1895
See application file for complete search history.

(56) References Cited

U.S. PATENT DOCUMENTS

| | | | |
|---|---|---|---|
| 5,684,722 A | 11/1997 | Thorner et al. | |
| 5,748,578 A | 5/1998 | Schell | |
| 5,857,986 A | 1/1999 | Moriyasu | |
| 6,050,393 A | 4/2000 | Murai et al. | |
| 6,278,790 B1 | 8/2001 | Davis et al. | |
| 6,332,029 B1 | 12/2001 | Azima et al. | |
| 6,388,520 B2 | 5/2002 | Wada et al. | |
| 6,580,796 B1 | 6/2003 | Kuroki | |
| 6,683,437 B2 | 1/2004 | Tierling | |
| 6,703,550 B2 | 3/2004 | Chu | |
| 6,762,745 B1 | 7/2004 | Braun et al. | |
| 6,906,697 B2 | 6/2005 | Rosenberg | |
| 6,995,747 B2 | 2/2006 | Casebolt et al. | |
| 7,154,470 B2 | 12/2006 | Tierling | |
| 7,623,114 B2 | 11/2009 | Rank | |
| 7,639,232 B2 | 12/2009 | Grant et al. | |
| 7,791,588 B2 | 9/2010 | Tierling et al. | |
| 7,979,146 B2 | 7/2011 | Ulrich et al. | |
| 8,068,025 B2 | 11/2011 | Devenyi et al. | |
| 8,098,234 B2 | 1/2012 | Lacroix et al. | |
| 8,102,364 B2 | 1/2012 | Tierling | |
| 8,325,144 B1 | 12/2012 | Tierling et al. | |
| 8,427,286 B2 | 4/2013 | Grant et al. | |
| 8,441,444 B2 | 5/2013 | Moore et al. | |
| 8,466,778 B2 | 6/2013 | Hwang et al. | |
| 8,480,240 B2 | 7/2013 | Kashiyama | |
| 8,572,293 B2 | 10/2013 | Cruz-Hernandez et al. | |
| 8,572,296 B2 | 10/2013 | Shasha et al. | |
| 8,593,269 B2 | 11/2013 | Grant et al. | |
| 8,648,829 B2 | 2/2014 | Shahoian et al. | |
| 8,659,208 B1 | 2/2014 | Rose et al. | |
| 8,754,757 B1 | 6/2014 | Ullrich et al. | |
| 8,947,216 B2 | 2/2015 | Da Costa et al. | |
| 8,981,915 B2 | 3/2015 | Birnbaum et al. | |
| 8,994,518 B2 | 3/2015 | Gregorio et al. | |
| 9,030,428 B2 | 5/2015 | Fleming | |
| 9,063,570 B2 | 6/2015 | Weddle et al. | |
| 9,083,821 B2 | 7/2015 | Hughes | |
| 9,092,059 B2 | 7/2015 | Bhatia | |
| 9,117,347 B2 | 8/2015 | Matthews | |
| 9,128,523 B2 | 9/2015 | Buuck et al. | |
| 9,164,587 B2 * | 10/2015 | Da Costa | A63F 13/23 |
| 9,196,135 B2 | 11/2015 | Shah et al. | |
| 9,248,840 B2 | 2/2016 | Truong | |
| 9,326,066 B2 | 4/2016 | Kilppel | |
| 9,329,721 B1 | 5/2016 | Buuck et al. | |
| 9,354,704 B2 | 5/2016 | Lacroix et al. | |
| 9,368,005 B2 | 6/2016 | Cruz-Hernandez et al. | |
| 9,489,047 B2 | 11/2016 | Jiang et al. | |
| 9,507,423 B2 | 11/2016 | Gandhi et al. | |
| 9,513,709 B2 | 12/2016 | Gregorio et al. | |
| 9,520,036 B1 | 12/2016 | Buuck et al. | |
| 9,588,586 B2 | 3/2017 | Rihn | |
| 9,640,047 B2 | 5/2017 | Choi et al. | |
| 9,652,041 B2 | 5/2017 | Jiang et al. | |
| 9,697,450 B1 | 7/2017 | Lee | |
| 9,715,300 B2 | 7/2017 | Sinclair et al. | |
| 9,740,381 B1 | 8/2017 | Chaudhri et al. | |
| 9,842,476 B2 | 12/2017 | Rihn et al. | |
| 9,864,567 B2 | 1/2018 | Seo | |
| 9,881,467 B2 | 1/2018 | Levesque | |
| 9,886,829 B2 | 2/2018 | Levesque | |
| 9,946,348 B2 | 4/2018 | Saboune et al. | |
| 9,947,186 B2 | 4/2018 | Macours | |
| 9,959,744 B2 | 5/2018 | Koskan et al. | |
| 9,965,092 B2 | 5/2018 | Smith | |
| 10,032,550 B1 | 7/2018 | Zhang et al. | |
| 10,055,950 B2 | 8/2018 | Bhatia et al. | |
| 10,074,246 B2 | 9/2018 | Da Costa et al. | |
| 10,110,152 B1 | 10/2018 | Hajati | |
| 10,171,008 B2 | 1/2019 | Nishitani et al. | |
| 10,175,763 B2 * | 1/2019 | Shah | G06F 3/016 |
| 10,264,348 B1 | 4/2019 | Harris et al. | |
| 10,275,087 B1 | 4/2019 | Smith | |
| 10,447,217 B2 | 10/2019 | Zhao et al. | |
| 10,564,727 B2 | 2/2020 | Billington et al. | |
| 10,620,704 B2 | 4/2020 | Rand et al. | |
| 10,732,714 B2 | 8/2020 | Rao et al. | |
| 2001/0043714 A1 | 11/2001 | Asada et al. | |
| 2002/0018578 A1 | 2/2002 | Burton | |
| 2003/0068053 A1 | 4/2003 | Chu | |
| 2003/0214485 A1 | 11/2003 | Roberts | |
| 2006/0028095 A1 | 2/2006 | Maruyama et al. | |
| 2006/0284856 A1 | 12/2006 | Soss | |
| 2008/0226109 A1 | 9/2008 | Yamakata et al. | |
| 2008/0240458 A1 | 10/2008 | Goldstein et al. | |
| 2008/0293453 A1 | 11/2008 | Atlas et al. | |
| 2008/0294984 A1 | 11/2008 | Ramsay et al. | |
| 2008/0316181 A1 | 12/2008 | Nurmi | |
| 2009/0020343 A1 | 1/2009 | Rothkopf et al. | |
| 2009/0079690 A1 | 3/2009 | Watson et al. | |
| 2009/0088220 A1 | 4/2009 | Persson | |
| 2009/0096632 A1 | 4/2009 | Ullrich et al. | |
| 2009/0102805 A1 | 4/2009 | Meijer et al. | |
| 2009/0153499 A1 | 6/2009 | Kim et al. | |
| 2009/0278819 A1 | 11/2009 | Goldenberg et al. | |
| 2010/0013761 A1 | 1/2010 | Birnbaum et al. | |
| 2010/0141408 A1 | 6/2010 | Doy et al. | |
| 2011/0056763 A1 | 3/2011 | Tanase et al. | |
| 2011/0141052 A1 | 6/2011 | Bernstein et al. | |
| 2011/0163985 A1 | 7/2011 | Bae et al. | |
| 2011/0167391 A1 | 7/2011 | Momeyer et al. | |
| 2012/0105358 A1 | 5/2012 | Momeyer et al. | |
| 2012/0112894 A1 | 5/2012 | Yang et al. | |
| 2012/0206246 A1 | 8/2012 | Cruz-Hernandez et al. | |
| 2012/0206247 A1 | 8/2012 | Bhatia et al. | |
| 2012/0229264 A1 | 9/2012 | Company Bosch et al. | |
| 2012/0253698 A1 | 10/2012 | Cokonaj | |
| 2012/0306631 A1 | 12/2012 | Hughes | |
| 2013/0027359 A1 | 1/2013 | Schevin et al. | |
| 2013/0038792 A1 | 2/2013 | Quigley et al. | |
| 2013/0141382 A1 | 6/2013 | Simmons et al. | |
| 2013/0275058 A1 | 10/2013 | Awad | |
| 2013/0289994 A1 | 10/2013 | Newman et al. | |
| 2014/0056461 A1 | 2/2014 | Afshar | |
| 2014/0064516 A1 | 3/2014 | Cruz-Hernandez et al. | |
| 2014/0079248 A1 | 3/2014 | Short et al. | |
| 2014/0118125 A1 | 5/2014 | Bhatia | |
| 2014/0119244 A1 | 5/2014 | Steer et al. | |
| 2014/0139327 A1 | 5/2014 | Bau et al. | |
| 2014/0226068 A1 | 8/2014 | Lacroix et al. | |
| 2014/0292501 A1 | 10/2014 | Lim et al. | |
| 2014/0340209 A1 * | 11/2014 | Lacroix | G06F 3/016 340/407.2 |
| 2014/0347176 A1 | 11/2014 | Modarres et al. | |
| 2015/0070260 A1 | 3/2015 | Saboune et al. | |
| 2015/0084752 A1 | 3/2015 | Heubel et al. | |
| 2015/0216762 A1 | 8/2015 | Oohashi et al. | |
| 2015/0324116 A1 | 11/2015 | Marsden et al. | |
| 2015/0325116 A1 | 11/2015 | Umminger, III | |
| 2015/0341714 A1 | 11/2015 | Ahn et al. | |
| 2016/0063826 A1 * | 3/2016 | Morrell | H04L 12/1895 340/407.1 |
| 2016/0070392 A1 | 3/2016 | Wang et al. | |
| 2016/0074278 A1 * | 3/2016 | Muench | A61H 23/02 601/46 |
| 2016/0132118 A1 | 5/2016 | Park et al. | |
| 2016/0141606 A1 | 5/2016 | Ahn et al. | |
| 2016/0162031 A1 | 6/2016 | Westerman et al. | |
| 2016/0179203 A1 | 6/2016 | Modarres et al. | |
| 2016/0239089 A1 | 8/2016 | Taninaka et al. | |
| 2016/0246378 A1 * | 8/2016 | Sampanes | G06F 3/016 |
| 2016/0358605 A1 | 12/2016 | Ganong, III et al. | |
| 2017/0078804 A1 | 3/2017 | Guo et al. | |
| 2017/0090572 A1 | 3/2017 | Holenarsipur et al. | |
| 2017/0153760 A1 | 6/2017 | Chawda et al. | |
| 2017/0168574 A1 | 6/2017 | Zhang | |
| 2017/0220197 A1 | 8/2017 | Matsumoto et al. | |

(56) References Cited

U.S. PATENT DOCUMENTS

| | | |
|---|---|---|
| 2017/0277350 A1 | 9/2017 | Wang et al. |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0151036 A1 | 5/2018 | Cha et al. |
| 2018/0158289 A1 | 6/2018 | Vasilev et al. |
| 2018/0160227 A1 | 6/2018 | Lawrence et al. |
| 2018/0178114 A1* | 6/2018 | Mizuta ............... G07F 17/3218 |
| 2018/0182212 A1 | 6/2018 | Li et al. |
| 2018/0183372 A1 | 6/2018 | Li et al. |
| 2018/0196567 A1 | 7/2018 | Klein et al. |
| 2018/0237033 A1 | 8/2018 | Hakeem et al. |
| 2018/0253123 A1 | 9/2018 | Levesque et al. |
| 2018/0321748 A1 | 11/2018 | Rao et al. |
| 2018/0329172 A1 | 11/2018 | Tabuchi |
| 2018/0335848 A1 | 11/2018 | Moussette et al. |
| 2018/0367897 A1 | 12/2018 | Bjork |
| 2019/0227628 A1 | 1/2019 | Rand et al. |
| 2019/0064925 A1 | 2/2019 | Kim et al. |
| 2019/0073078 A1 | 3/2019 | Sheng et al. |
| 2019/0103829 A1 | 4/2019 | Vasudevan et al. |
| 2019/0138098 A1* | 5/2019 | Shah ..................... A63F 13/285 |
| 2019/0163234 A1 | 5/2019 | Kim et al. |
| 2019/0206396 A1 | 7/2019 | Chen |
| 2019/0215349 A1 | 7/2019 | Adams et al. |
| 2019/0114496 A1 | 8/2019 | Lesso |
| 2019/0235629 A1 | 8/2019 | Hu et al. |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0311590 A1 | 10/2019 | Doy et al. |
| 2019/0341903 A1 | 11/2019 | Kim |
| 2020/0117506 A1 | 4/2020 | Chan |

FOREIGN PATENT DOCUMENTS

| | | |
|---|---|---|
| CN | 103403796 A | 11/2013 |
| CN | 204903757 U | 12/2015 |
| CN | 105264551 A | 1/2016 |
| CN | 106438890 A | 2/2017 |
| CN | 106950832 A | 7/2017 |
| CN | 107665051 A | 2/2018 |
| EP | 0784844 B1 | 6/2005 |
| EP | 2363785 A1 | 9/2011 |
| EP | 2487780 A1 | 8/2012 |
| EP | 2600225 A1 | 6/2013 |
| EP | 2846218 A1 | 3/2015 |
| EP | 2846229 A2 | 3/2015 |
| EP | 2846329 A1 | 3/2015 |
| EP | 3379382 A1 | 9/2018 |
| IN | 201747044027 | 8/2018 |
| JP | H02130433 B2 | 5/1990 |
| JP | 08149006 A | 6/1996 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017113651 A1 | 7/2017 |
| WO | 2018053159 A1 | 3/2018 |
| WO | 2018067613 A1 | 4/2018 |
| WO | 2018125347 A1 | 7/2018 |

OTHER PUBLICATIONS

International Search Report and Written Opinion of the International Searching Authority, International Application No. PCT/GB2019/050964, dated Sep. 3, 2019.

Communication Relating to the Results of the Partial International Search, and Provisional Opinion Accompanying the Partial Search Result, of the International Searching Authority, International Application No. PCT/US2018/031329, dated Jul. 20, 2018.

Combined Search and Examination Report, UKIPO, Application No. GB1720424.9, dated Jun. 5, 2018.

International Search Report and Written Opinion of the International Searching Authority, International Application No. PCT/GB2019/050770, dated Jul. 5, 2019.

International Search Report and Written Opinion of the International Searching Authority, International Application No. PCT/GB2019/052991, dated Mar. 17, 2020.

International Search Report and Written Opinion of the International Searching Authority, International Application No. PCT/US2020/023342, dated Jun. 9, 2020.

International Search Report and Written Opinion of the International Searching Authority, International Application No. PCT/GB2020/050823, dated Jun. 30, 2020.

Communication Relating to the Results of the Partial International Search, and Provisional Opinion Accompanying the Partial Search Result, of the International Searching Authority, International Application No. PCT/GB2020/050822, dated Jul. 9, 2020.

International Search Report and Written Opinion of the International Searching Authority, International Application No. PCT/GB2020/051037, dated Jul. 9, 2020.

International Search Report and Written Opinion of the International Searching Authority, International Application No. PCT/GB2020/051035, dated Jul. 10, 2020.

International Search Report and Written Opinion of the International Searching Authority, International Application No. PCT/US2020/024864, dated Jul. 6, 2020.

International Search Report and Written Opinion of the International Searching Authority, International Application No. PCT/US2020/056610, dated Jan. 21, 2021.

First Examination Opinion Notice, State Intellectual Property Office of the People's Republic of China, Application No. 201880037435.X, dated Dec. 31, 2020.

International Search Report and Written Opinion of the International Searching Authority, International Application No. PCT/GB2020/052537, dated Mar. 9, 2021.

Office Action of the Intellectual Property Office, ROC (Taiwan) Patent Application No. 107115475, dated Apr. 30, 2021.

First Office Action, China National Intellectual Property Administration, Patent Application No. 2019800208570, dated Jun. 3, 2021.

* cited by examiner

METHODS AND APPARATUS FOR OUTPUTTING A HAPTIC SIGNAL TO A HAPTIC TRANSDUCER

TECHNICAL FIELD

Embodiments of the present disclosure relate to methods and apparatus for outputting a haptic signal to a haptic transducer. In particular, representations of parts of haptic signals are stored with associated user experiences to which they correspond.

BACKGROUND

Vibrational haptic devices, for example Linear Resonant Actuators (LRAs), have been used in devices such as mobile devices to generate vibrational feedback for user interaction with the device. Among various vibration feedbacks, haptic alter-tones or vibrational ringtones are an important type of vibrational notification.

The playback of haptic signals to produce haptic effects which may be sensed by a user may be similar to music and audio ringtones. The storage of the haptic signals used to create the haptic effects may use similar methods as those for storing ringtones, for example pulse code modulation (PCM) waveforms. However, when the content of the haptic signal is longer in duration, and a larger variety of haptic effects are required, the more memory is then required for both generation and storage of the haptic signals.

SUMMARY

According to some embodiments, there is provided a method for outputting a haptic signal to a haptic transducer. The method comprises storing a representation of a part of the haptic signal comprising a first information point indicating a first amplitude and at least one first frequency of the part of the haptic signal at a first time, wherein the representation is associated with a user experience; responsive to receiving an indication of occurrence of the user experience, determining the haptic signal based on the first information point such that the part of the haptic signal has the first amplitude and the at least one first frequency at the first time; and outputting the haptic signal to the haptic transducer.

In some embodiments, the first time is defined relative to a start time of the part of the haptic signal.

In some embodiments, the representation of the part of the haptic signal further comprises a second information point indicating a second amplitude and a second frequency of the part of haptic signal at a second time. In some embodiments, the second time is defined relative to the first time.

In some embodiments, the method further comprises generating the haptic signal based on the second information point such that the part of the haptic signal has the second amplitude and the second frequency at the second time. In some embodiments, the method further comprises generating the haptic signal such that an amplitude of the part of the haptic signal increases from the first amplitude to the second amplitude between the first time and the second time.

In some embodiments, the method further comprises generating the haptic signal such that a frequency of the part of the haptic signal increases from the first frequency to the second frequency between the first time and the second time.

In some embodiments, the representation of the part of the haptic signal further comprises a repetition time. The haptic signal may be generated such that the part of the haptic signal is repeated after the repetition time.

In some embodiments the representation of the part of the haptic signal further comprises an indication of a number, X, of repetitions, where X is an integer value, and the method comprises generating the haptic signal such that the part of the haptic signal is repeated X times at intervals of the repetition time.

According to some embodiments, there is provided a method of generating a haptic signal for output to a haptic transducer. The method comprises responsive to receiving an indication of occurrence of a user experience, generating a first part of haptic signal based on a stored representation of the first part of the haptic signal comprising information relating to a first amplitude of the first part of haptic signal; and generating a second part haptic signal based on a stored representation of the second part of the haptic signal comprising information relating to a second amplitude of the second part of haptic signal, wherein the representation of the first part of the haptic signal and the representation of the second part of the haptic signal are associated with the user experience.

The second part of the haptic signal may be generated a desired wait time following the end of the first part of the haptic signal.

The stored representation of the first part of the haptic signal may comprise a pulse code modulation of the first part of the haptic signal. The stored representation of the second part of the haptic signal may comprise a pulse code modulation of the second part of the haptic signal. In some embodiments the stored representation of the first part of the haptic signal comprises a first information point indicating a first amplitude and at least one first frequency of the first part of the haptic signal at a first time. The stored representation of the second part of the haptic signal may comprise a second information point indicating a second amplitude and at least one second frequency of the second part of the haptic signal at a second time. Any combination of different types of stored representation may be used for the first part of the haptic signal and the second part of the haptic signal.

In some embodiments the method comprises receiving an audio signal for output to a speaker; wherein the step of receiving an indication of occurrence of a user experience comprises detecting the user experience in the audio signal.

The stored representation of the first part of the haptic signal and the stored representation of the second part of the haptic signal may be associated with the user experience as part of a stored code associated with the user experience. The stored code may comprise an indication of the stored representation of the first part of the haptic signal; an indication of the stored representation of the second part of the haptic signal; and an indication of a time to elapse between the stored representation of the first part of the haptic signal and the stored representation second part of the haptic signal.

In some embodiments the stored code further comprises an indication of an amplitude to playback the stored representation of the first part of the haptic signal.

According to some embodiments, there is provided a haptic signal generator for outputting a haptic signal to a haptic transducer. The haptic signal generator comprises a memory configured to store a representation of a part of the haptic signal comprising a first information point indicating a first amplitude and at least one first frequency of the part of the haptic signal at a first time, wherein the representation is associated with a user experience; and processing circuitry configured to, responsive to receiving an indication of occurrence of the user experience, determine the haptic signal based on the first information point such that the part of the haptic signal has the first amplitude and the at least one first frequency at the first time; and output the haptic signal to the haptic transducer.

According to some embodiments, there is provided a haptic signal generator for generating a haptic signal for output to a haptic transducer. The haptic signal generator comprises processing circuitry configured to responsive to receiving an indication of occurrence of a user experience, generate a first part of haptic signal based on a stored representation of the first part of the haptic signal comprising information relating to a first amplitude of the first part of haptic signal; and generate a second part haptic signal based on a stored representation of the second part of the haptic signal comprising information relating to a second amplitude of the second part of haptic signal, wherein the representation of the first part of the haptic signal and the representation of the second part of the haptic signal are associated with the user experience.

According to some embodiments there is provided an electronic apparatus comprising a haptic signal generator for outputting a haptic signal to a haptic transducer. The haptic signal generator may be as described above. The electronic apparatus may comprise at least one of: a portable device; a battery power device; a computing device; a communications device; a gaming device; a mobile telephone; a personal media player; a laptop, tablet; a notebook computing device, or a smart home device.

According to some embodiments there is provided an electronic apparatus comprising a haptic signal generator for generating a haptic signal for output to a haptic transducer. The haptic signal generator may be as described above. The electronic apparatus may comprise at least one of: a portable device; a battery power device; a computing device; a communications device; a gaming device; a mobile telephone; a personal media player; a laptop, tablet; a notebook computing device, or a smart home device.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Figure 1:
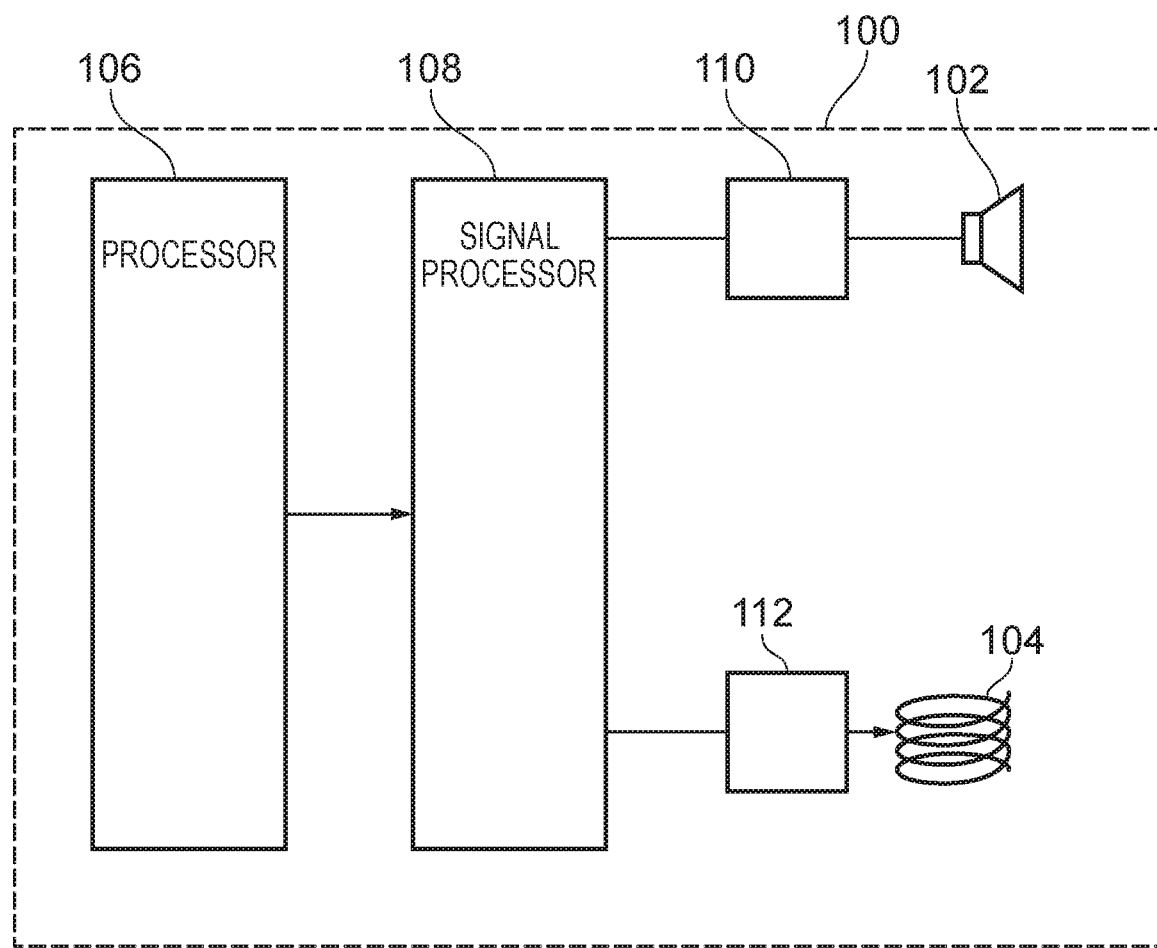
FIG. 1 is an example schematic diagram showing part of a device having a haptic output transducers in accordance with some embodiments.

FIG. 1 is an example schematic diagram showing part of a device 100 having a haptic output transducer 104. The device 100 may comprise any electronic apparatus, a portable device; a battery power device; a computing device; a communications device; a gaming device; a mobile telephone; a personal media player; a laptop, tablet or notebook computing device, smart watch, a virtual reality (VR) or augmented reality (AR) device, or a smart home device, for example. For the sake of clarity, elements of the device 100 which are not relevant to the present disclosure are not shown in FIG. 1, but those skilled in the art will appreciate that the device 100 may include further elements and components in addition to those shown in FIG. 1.

The device 100 comprises a processor 106, which may be, for example, an application processor. The processor 106 interfaces with a signal processor 108, which may be, for example, a digital signal processor (DSP). The signal processor 108 may interface with an audio output amplifier 110, which may be configured to output an audio signal to drive the audio output transducer 102. The signal processor 108 also interfaces with a haptic output amplifier 112, which is configured to output a haptic signal to drive the haptic transducer 104

The signal processor 108 may also interface with any other output devices capable of providing a sensory output to a user, for example a screen.

The processor 106 runs an operating environment of the device 100 to allow software applications to be executed by the device 100. Such an application may receive user inputs. The user inputs may include one or more of: touch and/or gestural user inputs that may be detected by a touch-sensitive surface (e.g. a touch screen) of the device (not shown); kinetic user inputs, such as rotating or tilting the device that may be detected by a sensor, such as an accelerometer or gyroscope of the device (also not shown); and audio user inputs, such as spoken commands that may be detected by a sensor, such as a microphone of the device (also not shown). In response to detection of a user input, the application may be operative to generate appropriate outputs at the device. For example, the application may be operative to cause images displayed on a display of the device (not shown) to be updated, and to cause appropriate audio effects to be output by the audio output transducer 102. The application may also be operative to cause appropriate haptic outputs to be provided by the haptic output transducer 104 in response to detection of user inputs. These user inputs, of all types, may be described as a user experience.

The sensory outputs provided to the user via any one of the output components of the device, for example the display (not shown) and the audio output transducer 102, may also be described as a user experience.

In some examples, signal processor 108 may be configured to actuate the haptic output transducer 104 to cause the device 100 to vibrate at the same in conjunction with a sensory output user experience (for example, the display of images on a display or screen being updated and/or an audio effect being output by the output audio transducer 102) thereby providing additional sensory information to the user.

Haptic effects, such as haptic ringtones, may comprise a sequence of shorter components. The haptic effects may be actuated together with some user experience, for example a user input such as a button press, or a touch on a specific location on a touch screen, or a sensory output such as the playback of some audio content to the user. The playback of a haptic signal to provide the haptic effect along with the user experience generates a composite sensory experience for the user.

There may be a variety of different haptic effects produced by driving the haptic output transducer 104 with haptic signals of different shapes, frequencies, and amplitudes. Each haptic effect may produce a different sensation for a user.

As previously described, pulse code modulation (PCM) waveforms may be used to store haptic signals that are used to drive a transducer to produce haptic effects. However, it may be difficult to store long (for example greater than 500 ms) PCM waveforms in memory, for example, in random access memory of a haptic driver integrated circuit or in a corresponding digital signal processor (DSP).

However, in some examples, the haptic signals contain periods of "silence" during which there is effectively no haptic effect produced. The PCM waveforms used to store these haptic signals also therefore include the periods of "silence". However, the "silent" periods in the haptic signals still consume memory space.

Figure 2:
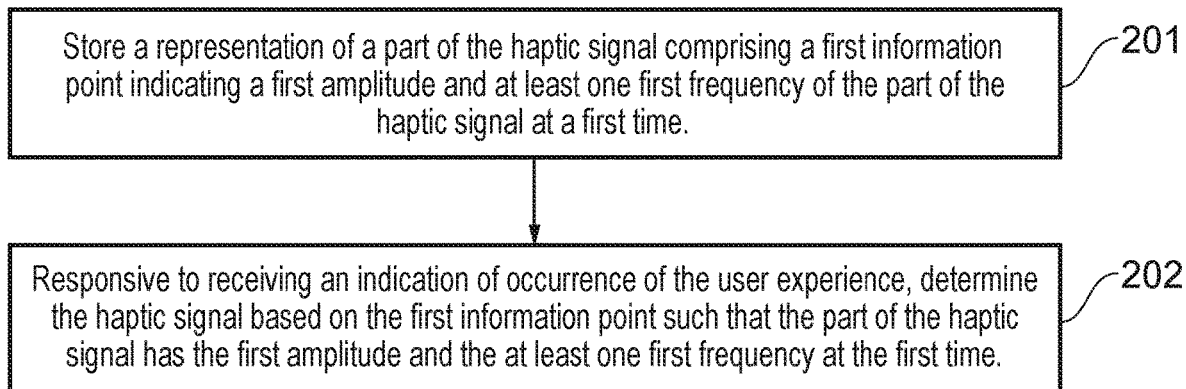
FIG. 2 is a flow chart illustrating an example method for outputting a haptic signal to a haptic transducer in accordance with some embodiments.

FIG. 2 is a flow chart illustrating an example method for outputting a haptic signal to a haptic transducer. The method may be performed by a signal processor such as for example the processor 108 in FIG. 1 and/or any other system operable to implement the method. In certain embodiments, the method of FIG. 2 may be implemented partially or fully in software and/or firmware embodied in computer-readable media.

In step 201, the method comprises storing a representation of a part of the haptic signal comprising a first information point indicating a first amplitude and at least one first frequency of the part of the haptic signal at a first time.

In other words, the haptic signal may be deconstructed into parts of the haptic signal that may be referred to herein as a "haptic atoms". These haptic atoms comprise parts of the haptic signal. The haptic atoms may be represented by information relating to the spectral content of the part of the haptic signal, a time duration of the part of the haptic signal, and an amplitude of the part of the haptic signal. The representations may comprise enough information to allow the haptic atom to be reconstructed by the signal processor based on the information that they contain.

In particular, where a haptic signal comprises periods of silence (i.e. where no haptic effect is output by the haptic transducer), the haptic signal may be deconstructed into the haptic atoms which comprise the parts of the haptic signal that are not "silent".

The representation of a haptic atom may be associated with a user experience. For example, a first representation may be associated with a specific user input, for example a button click. A second representation may be associated with the playback of a specific audio event or alert. The representation may be stored with an indication of the associated user experience.

In step 202, the method comprises, responsive to receiving an indication of occurrence of the user experience, determining the haptic signal based on the first information point such that the part of the haptic signal has the first amplitude and the at least one first frequency at the first time.

In other words, in response to receiving an indication of occurrence of the user experience, for example a notification of a button press occurring, or a detection of a specific audio event in an audio signal to be output to an output audio transducer, the method comprises generating the haptic signal from the stored representation of the haptic atom which is associated with the user experience.

In step 202, the method comprises outputting the haptic signal to the haptic transducer.

The representation of the part of the haptic signal may be stored in a piece wise linear envelope format. A PWLE comprises one or more information points, each information point may comprise an amplitude value and at least one frequency value at a particular time in the part of the haptic signal.

For example, table 1 illustrates an example PWLE for a first haptic atom. In this example, the PWLE comprises four information points.

TABLE 1

Table 1 illustrates a PWLE for a first haptic atom 310.

| Item | Value | Units |
|---|---|---|
| Time | 120 | ms |
|  | 200 |  |
|  | 500 |  |
|  | 540 |  |
| Amplitude | 0.16234 | FFS voltage |
|  | 0.07305 |  |
|  | 0.07305 |  |
|  | 0 |  |
| Frequency | 200 | Hz |
|  | 200 |  |
|  | 200 |  |
|  | 200 |  |

A first information point comprises the first time 120 ms. This time value may for example, represent the time 120 ms after the start of the part of the haptic signal (haptic atom).

The first information point also comprises the first amplitude value of 0.16234. This amplitude value is expressed as a fraction of the fullscale (FFS) voltage available for the haptic transducer, which in this example is 12.32V. However, it will be appreciated that the amplitude value may be expressed in any suitable way. The first information point further comprises the first frequency value of 200 Hz.

Effectively, this first information point conveys that the first haptic atom has a voltage of 0.16234 FFS and a frequency of 200 Hz at a time 120 ms after the start of the first haptic atom.

A second information point comprises the second time 200 ms. This second time may for example, represent the time 200 ms after the start of the part of the haptic signal (first haptic atom). In some examples, the second time may be defined relative to the first time. The second information point also comprises the second amplitude value of 0.07305. This amplitude value is expressed as a fraction of the full-scale voltage available for the haptic transducer, which in this example is 12.32V. However, it will be appreciated that the amplitude value may be expressed in any suitable way. The second information point further comprises the second frequency value of 200 Hz.

Effectively, this second information point conveys that the first haptic atom has a voltage of 0.07305 FFS and a frequency of 200 Hz at a time 200 ms after the start of the first haptic atom.

A third information point comprises the third time 500 ms. This third time may for example, represent the time 500 ms after the start of the part of the haptic signal. The third information point also comprises the third amplitude value of 0.07305. This amplitude value is expressed as a fraction of the full-scale voltage available for the haptic transducer, which in this example is 12.32V. However, it will be appreciated that the amplitude value may be expressed in any suitable way. The third information point further comprises the third frequency value of 200 Hz.

Effectively, this third information point conveys that the first haptic atom has a voltage of 0.07305 FFS and a frequency of 200 Hz at a time 500 ms after the start of the first haptic atom.

A fourth information point comprises the fourth time 540 ms. This fourth time may for example, represent the time 540 ms after the start of the part of the haptic signal (first haptic atom). The fourth information point also comprises the fourth amplitude value of 0. This amplitude value is expressed as a fraction of the full-scale voltage available for the haptic transducer, which in this example is 12.32V. However, it will be appreciated that the amplitude value may be expressed in any suitable way. The fourth information point further comprises the fourth frequency value of 200 Hz.

Effectively, this fourth information point conveys that the first haptic atom has a voltage of 0 FFS and a frequency of 200 Hz at a time 540 ms after the start of the first haptic atom.

Figure 3:
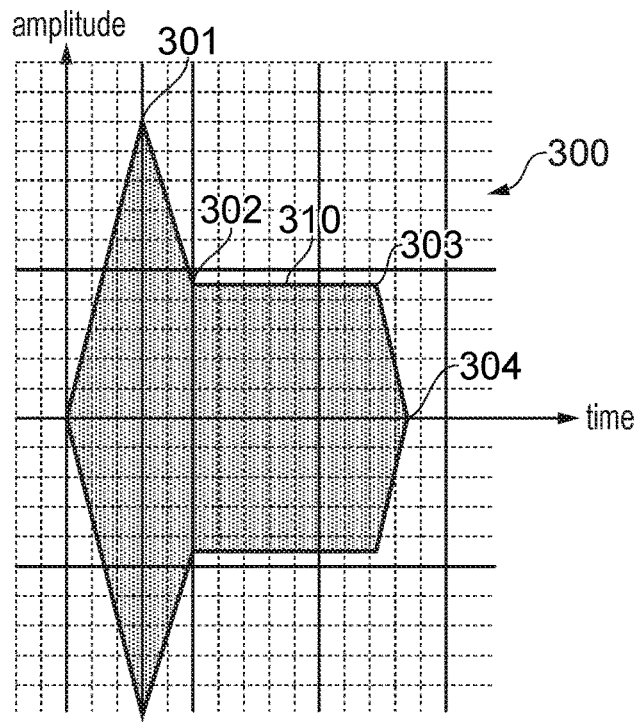
FIG. 3 illustrates an example haptic signal comprising a haptic atom in accordance with some embodiments.

FIG. 3 illustrates an example haptic signal 300 comprising the first haptic atom 310 generated from the PWLE illustrated in Table 1.

The information contained in the representation of the first haptic atom 310 illustrated in Table 1 may be used to recreate the first haptic atom as illustrated in FIG. 3.

The haptic signal 300 is created such that the haptic signal 300 has the amplitude and frequency in each information point at the time specified in each information point.

In other words, point 301 corresponds to the first information point, point 302 corresponds to the second information point, point 303 corresponds to the third information point, and point 304 corresponds to the fourth information point.

In this example, the haptic signal is generated comprising the first haptic atom such that the amplitude of the first haptic atom decreases from the first amplitude to the second amplitude between the first time (i.e. 120 ms after a default start time) and the second time (i.e. 200 ms after a default start time). In this example, the amplitude decreases linearly between the first time and the second time. However, in some examples, a different rule for the way in which the first haptic atom is created between information points may be defined. For example, to produce a square wave type haptic atom, a haptic atom may be generated by switching the amplitude and/or frequency of the haptic atom at the occurrence of an information point.

In some examples, the haptic atom may comprise a default start at having an amplitude of 0 and a default start frequency of F1. The amplitude may then increase linearly between the start and the first time indicated in the first information point.

In this example illustrated in FIG. 3, the frequency of the first haptic atom remains constant throughout the first haptic atom, and there is only one frequency used. However, it will be appreciated that multiple frequencies may be used, and that the frequency may be changed between information points. Again, in some examples, the haptic signal may be generated such that a frequency of the first haptic atom increases from a first frequency to a second frequency between a first time and a second time.

By storing the representation of the first haptic atom in PWLE format rather than as a PCM waveform, the memory required to store haptic signal is reduced.

TABLE 2

Table 2 illustrates an example of a PWLE for a haptic atom 310.

| Item | Value | Units |
|---|---|---|
| Repetition Time | 260 | ms |
| Repetition Number | 1 | N/A |
| Time | 120 | ms |
|  | 200 |  |
|  | 500 |  |
|  | 540 |  |
| Amplitude | 0.16234 | FFS voltage |
|  | 0.07305 |  |
|  | 0.07305 |  |
|  | 0 |  |
| Frequency | 200 | Hz |
|  | 200 |  |
|  | 200 |  |
|  | 200 |  |

Figure 4:
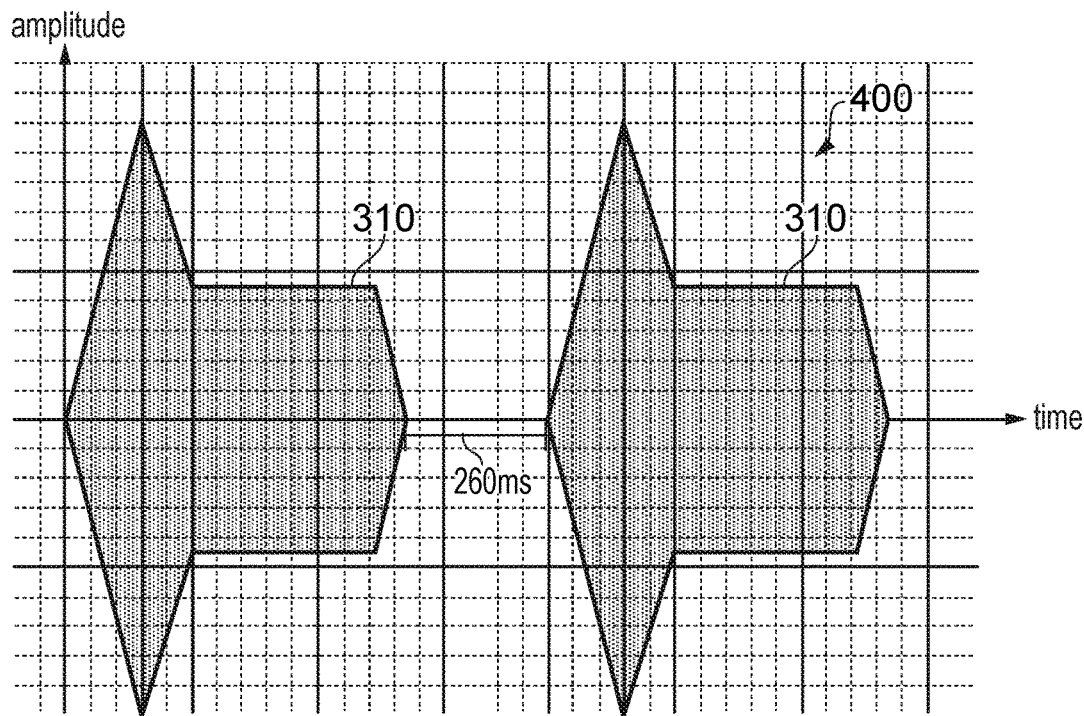
FIG. 4 illustrates a haptic signal comprising a haptic atom in accordance with some embodiments.

FIG. 4 illustrates a haptic signal 400 comprising a haptic atom 310 generated from the PWLE illustrated in Table 2.

The PWLE in Table 2 comprises the same information points as in Table 1. However, the PWLE in Table 2 further comprises a repetition time. In this example, the repetition time is 260 ms.

The haptic signal 400 may therefore be generated such that the haptic atom 310 is repeated after the repetition time.

In some examples, the representation of the part of the haptic signal further comprises an indication of a number, X, of repetitions, where X is an integer value, and the method comprises: generating the haptic signal such that the part of the haptic signal is repeated X times at intervals of the repetition time.

In the example illustrated in table 2 and FIG. 4, the number of repetitions is 1 (i.e. X=1). However, it will be appreciated that any number of repetitions may be used.

In some examples, the haptic signal may comprise multiple haptic atoms, each having separate representations. For example, a haptic signal may comprise a first haptic atom that creates a short buzz haptic effect and a second haptic atom which creates a longer softer haptic effect. The two haptic atoms of the haptic signal may be represented and stored separately in separate representations. In some examples, different parts of a haptic signal (i.e. haptic atoms) may be stored in different types of representation. For example, one haptic atom may be stored using a PWLE and a different haptic atom may be stored using a PCM waveform.

Figure 5:
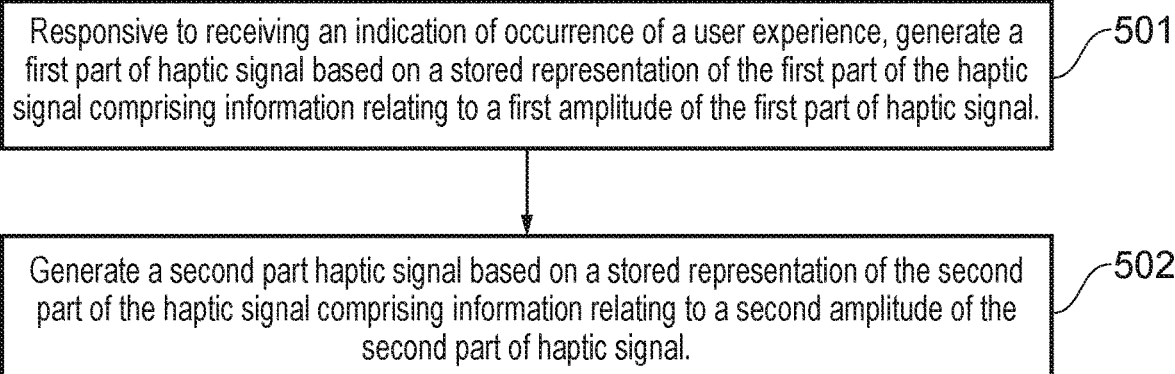
FIG. 5 is a flow chart illustrating an example method for outputting a haptic signal to a haptic transducer in accordance with some embodiments.

FIG. 5 is a flow chart illustrating an example method for outputting a haptic signal to a haptic transducer. The method in FIG. 5 may be implemented by the signal processor 108 illustrated in FIG. 1 and/or any other system operable to implement the method. In certain embodiments, the method of FIG. 2 may be implemented partially or fully in software and/or firmware embodied in computer-readable media.

In step 501, the method comprises, responsive to receiving an indication of occurrence of a user experience, generating a first part of haptic signal based on a stored representation of the first part of the haptic signal comprising information relating to a first amplitude of the first part of haptic signal.

In this example, the representation of the first part of the haptic signal (or the first haptic atom) may be any representation comprising information relating to a first amplitude of the first part of the haptic signal. For example, the representation may be a PWLE representation or a PCM waveform.

The PCM waveform representation may be used for short haptic effects, such as sharp high intensity vibration spikes. The short duration of these haptic effects may lower the storage requirement naturally in the time-domain. Depending on the characteristics of the haptic transducer, (for example a Linear Resonant Actuator (LRA)) the PCM waveform representation may need to be pre-processed to adjust the PCM waveform such that it is suitable for reproduction on the haptic transducer.

A PLWE representation of a haptic atom may be used for longer continuous tonal haptic effects as it may be more storage efficient that a PCM waveform. In particular, a sequence of haptic atoms may be represented by a plurality of different PWLEs.

In step 502, the method comprises generating a second part haptic signal based on a stored representation of the second part of the haptic signal comprising information relating to a second amplitude of the second part of haptic signal.

Again, in this example, the representation of the second part of the haptic signal (or the second haptic atom) may be any representation comprising information relating to a first amplitude of the first part of the haptic signal. For example, the representation of the second part of the haptic signal may be a PWLE representation or a PCM waveform.

The representation of the first part of the haptic signal and the representation of the second part of the haptic signal are stored such that they are both stored associated with the user experience.

Figure 6A:
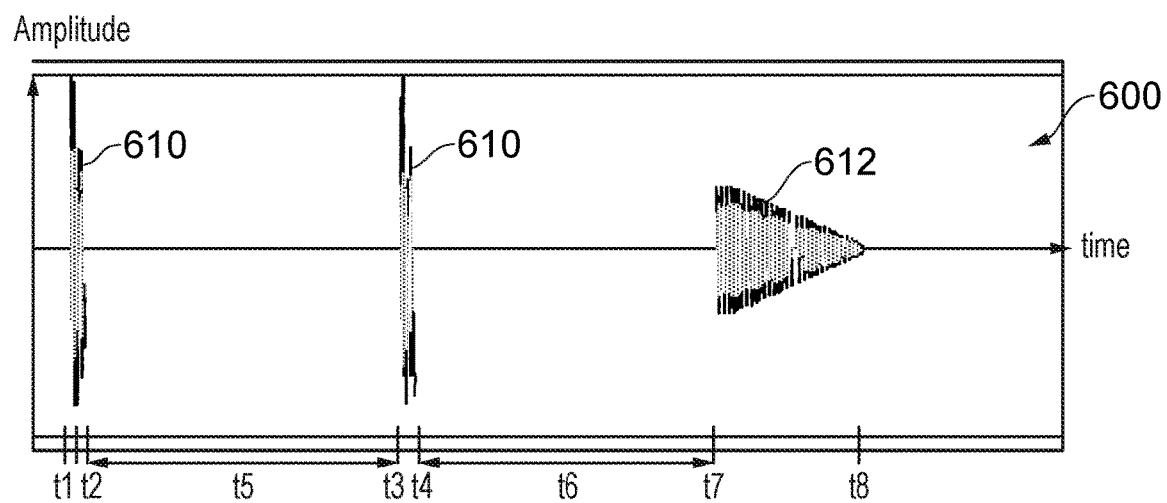
FIG. 6A illustrates an example haptic signal comprising a first haptic atom and a second haptic atom in accordance with some embodiments.

FIG. 6A illustrates an example haptic signal 600 comprising a first haptic atom 610 and a second haptic atom 612.

In this example, the haptic signal is generated responsive to detecting a specific audio event in an audio signal. In other words, the user experience in this example comprises the audio event illustrated in FIG. 6B.

In other words, in some examples, the method of FIG. 5 may comprise receiving an audio signal for output to a speaker. In this example, the receiving of an indication of occurrence of a user experience in step 501 may comprise detecting the user experience in the audio signal. In other words, the user experience may comprise an audio event and the indication of the occurrence of a user experience may be detected in the received audio signal.

In this example, a first haptic atom 610 is associated with two sections of the user experience. This first haptic atom 610 may be stored in a number of different ways. For example, the first haptic atom may be stored as associated with the user experience 614 between times t1 and t2, and times t3 and t4. Alternatively, the haptic atom 610 may be stored with a repetition period of the value of t5, with a repetition number of 1.

In this example, the user experience 614 is associated with a second haptic atom 612. The second haptic atom may be generated a desired wait time t6 following the end of first haptic atom. The desired wait time may be stored along with the associated first part of the haptic signal with the user experience. In other words, referring to the example in FIGS. 6A and 6B, the second part of the haptic signal may be associated with the section of the user experience between times t7 and t8.

In some examples, a sequence of haptic atoms (or sequence of parts of a haptic signal) may be associated with a user experience. For example, the method may comprise storing a sequence of haptic atoms associated with a user experience.

For example, for a user experience such as 614, the sequence of haptic atoms to be used to generate the haptic signal 600 may be stored using a code. For example, the first haptic atom 610 may be represented by "x" in a code, and the second haptic atom 612 is represented by "y" in a code.

The following code may then be used to represent the haptic signal 600:

x.100, t5, x.100, t6, y.40

This code may be understood as instructions to a signal processor to perform the following:
1) play back the first haptic atom "x" at 100% of design amplitude,
2) follow the first haptic atom "x" by t5 seconds of blank time,
3) play back the first haptic atom "x" again at 100% of design amplitude,
4) follow the first haptic atom "x" with t6 seconds of blank time,
5) play the second haptic atom "y" at 40% of design amplitude.

In other words, the first haptic atom and the second haptic atom are associated with the user experience as part of a stored code associated with the user experience. The stored code may comprise an indication of the first haptic atom (in this example "x"); an indication of the second haptic atom (in this example "y"); and an indication of a time to elapse between the first haptic atom and the second haptic atom (in this example t6).

In some examples the stored code may further comprise an indication of an amplitude to playback the first haptic atom (in this example 100% of the design amplitude, although it will be appreciated that other method for defining the amplitude may be used).

Figure 6B:
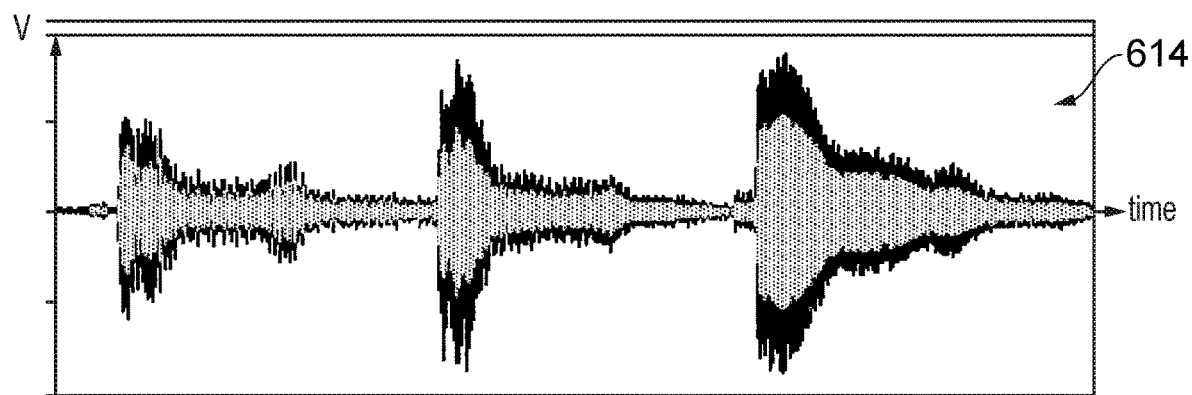
FIG. 6B illustrates an example user experience comprising an audio event in accordance with some embodiments.

In this example therefore, when the user experience in FIG. 6B is detected, the method of FIG. 5 may comprise retrieving the sequence of haptic atoms stored associated with the indication of the detected user experience, and generating the haptic signal according to the code, for example, by retrieving each representation of each individual haptic atom from storage, and generating each part of the haptic signal as instructed in the code.

When using a haptic driver integrated circuit (IC) (or other amplifier+DSP), during the playback of a haptic signal that comprises multiple haptic atoms separated by periods of silence, as for example illustrated in FIG. 6A, the IC's firmware may send out an alert signal each time that a haptic atom has finished playback to notify the corresponding driver (or microcontroller unit (MCU) or similar) that waveform playback has finished. The driver may then utilize a clock to determine when a user specified silence period has ended so that it may play back the next haptic atom/component in queue. The above procedure may also be performed exclusively at the firmware level.

When considering the example illustrated in FIG. 6A, it is understood that, had the resulting haptic signal 600 have been stored as a single PCM waveform, the "silent" periods between t2 and t3, and t4 and t7 would have also been represented in the single PCM waveform, and that storage space used to store those silent periods has been released by instead representing the haptic signal using haptic atoms as described in FIGS. 5 and 6A.

Figure 7:
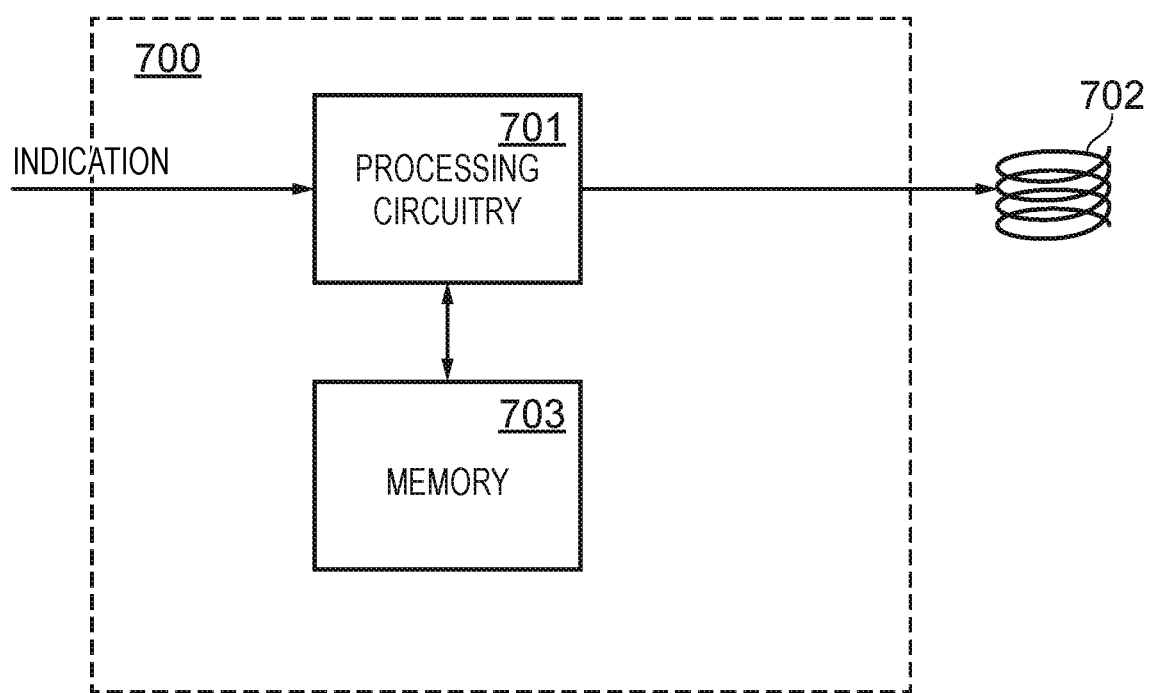
FIG. 7 illustrates an example system having a processor configured to output a haptic signal to a haptic transducer in accordance with some embodiments.

FIG. 7 illustrates an example haptic signal generator 700 comprising processing circuitry 701 configured to output a haptic signal to a haptic transducer 702. The processing circuitry 701 may for example be the signal processor 108 illustrated in FIG. 1. The haptic signal generator 700 may be configured to perform the method as described with reference to FIGS. 2 and 5 above.

Processing circuitry 701 may comprise an input for receiving an indication of occurrence of a user experience. As explained previously, this indication may be a notification of the occurrence of a user input, for example, a button press, touch screen activation, tilting a device, or a voice activation. The indication may alternatively be the detection of a sensory event (e.g. an audio event) in a sensory output signal (e.g. audio signal) to be output to the user.

The haptic signal generator 700 further comprises memory 703. The memory 703 may be configured to store representations of haptic atoms as described above with reference to FIGS. 2 to 6B. In particular, the memory 703 may be configured to store a representation of a part of the haptic signal comprising a first information point indicating a first amplitude and at least one first frequency of the part of the haptic signal at a first time, wherein the representation is associated with a user experience.

The processing circuitry 701 may be configured to; responsive to receiving an indication of the user experience, determine the haptic signal based on the first information point such that the part of the haptic signal has the first amplitude and the at least one first frequency at the first time. For example, the processing circuitry 701 may be configured to retrieve the representation of the part of the haptic signal from the memory 703 by transmitting the indication of the user experience to the memory 703, and receiving the representation of the part of the haptic signal in response.

The processing circuitry 701 may then be further configured to output the haptic signal to the haptic transducer.

In some examples, the processing circuitry 701 may be configured to generate a second part haptic signal based on a stored representation of the second part of the haptic signal comprising information relating to a second amplitude of the second part of haptic signal, wherein the representation of the first part of the haptic signal and the representation of the second part of the haptic signal are associated with the user experience in the memory 703. In some examples, the representation of the second part of the haptic signal may comprise a PLWE representation or a PCM waveform.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfill the functions of several units recited in the claims. Any reference numerals or labels in the claims shall not be construed so as to limit their scope. Terms such as amplify or gain include possible applying a scaling factor or less than unity to a signal.

It will of course be appreciated that various embodiments of the analog conditioning circuit as described above or various blocks or parts thereof may be co-integrated with other blocks or parts thereof or with other functions of a host device on an integrated circuit such as a Smart Codec.

The skilled person will thus recognize that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solution to problems that are described herein with regard to specific embodiments are not intended to be construed as a critical, required, or essential feature of element.

Further embodiments likewise, with the benefit of this disclosure, will be apparent to those having ordinary skill in the art, and such embodiments should be deemed as being encompasses herein.

The invention claimed is:

1. A method for outputting a haptic signal to a haptic transducer, the method comprising:
   storing first information for reconstruction of a first haptic atom, wherein the first information comprises a first information point and a second information point, wherein the first information point indicates a first amplitude and at least one first frequency of the first haptic atom at a first time, and the second information point indicates a second amplitude and at least one second frequency of the first haptic atom at a second time, and wherein the first information is associated with a user experience;
   responsive to receiving an indication of occurrence of the user experience, generating the haptic signal based on the first information such that the haptic signal comprises the first haptic atom having the first amplitude and the at least one first frequency at the first time, and the second amplitude and the second frequency at the second time; and
   outputting the haptic signal comprising the first haptic atom to the haptic transducer.

2. The method of claim 1 wherein the first time is defined relative to a start time of the first haptic atom.

3. The method of claim 1 wherein the second time is defined relative to the first time.

4. The method of claim 1 further comprising:
generating the haptic signal such that an amplitude of the first haptic atom increases from the first amplitude to the second amplitude between the first time and the second time.

5. The method of claim 1 further comprising:
generating the haptic signal such that a frequency of the first haptic atom increases from the first frequency to the second frequency between the first time and the second time.

6. The method of claim 1 wherein the first information further comprises a repetition time.

7. The method of claim 6 further comprising:
generating the haptic signal such that the first haptic atom is repeated after the repetition time.

8. The method of claim 6 wherein the first information further comprises an indication of a number, X, of repetitions, where X is an integer value, and the method comprises:
generating the haptic signal such that the first haptic atom is repeated X times at intervals of the repetition time.

9. The method as claimed in claim 1 wherein the first haptic atom comprises a part of the haptic signal.

10. The method of claim 1, wherein information for reconstruction of a plurality of haptic atoms is stored associated with the user experience; and the method further comprises:
responsive to receiving the indication of occurrence of the user experience, generating the haptic signal based information for reconstruction of a plurality of haptic atoms such that the haptic signal comprises a sequence of haptic atoms.

11. The method of claim 1 wherein the user experience comprises a button press by a user.

12. The method of claim 1 wherein the user experience comprises a sensory event output to a user.

13. A method of generating a haptic signal for output to a haptic transducer, the method comprising:
responsive to receiving an indication of occurrence of a user experience, retrieving stored representations of a plurality of haptic atoms, wherein the stored representations are stored associated with the user experience; and
reconstructing, based on the stored representations, the haptic signal such that the haptic signal comprises a sequence of the plurality of haptic atoms; and
outputting the haptic signal to the haptic transducer.

14. The method of claim 13 further comprising:
generating the haptic signal such that two of the plurality of haptic atoms are separated by a desired wait time.

15. The method of claim 13 wherein at least one of the stored representations comprises a pulse code modulation of one of the plurality of haptic atoms.

16. The method of claim 13 wherein at least one of the stored representations comprises a first information point indicating a first amplitude and at least one first frequency of the first part of one of the plurality of haptic atoms at a first time.

17. The method of claim 13 further comprising:
receiving an audio signal for output to a speaker; wherein the step of receiving the indication of occurrence of the user experience comprises detecting the user experience in the audio signal.

18. The method of claim 13 wherein stored representations are stored associated with the user experience as part of a stored code associated with the user experience.

19. The method of claim 18 wherein the stored code comprises:
an indication of a first stored representation of a first haptic atom;
an indication of a second stored representation of a second haptic atom; and
an indication of a time to elapse between the first haptic atom and the second haptic atom.

20. The method as claimed in claim 19 wherein the stored code further comprises an indication of an amplitude to playback the first haptic atom.

21. The method as claimed in claim 13 wherein the plurality of haptic atoms each comprise a part of the haptic signal.

22. The method of claim 13 wherein the user experience comprises a button press by a user.

23. The method of claim 13 wherein the user experience comprises a sensory event output to a user.

24. A haptic signal generator for outputting a haptic signal to a haptic transducer, the haptic signal generator comprising:
a memory configured to store first information for reconstruction of a first haptic atom, wherein the first information comprises a first information point and a second information point, wherein the first information point indicates a first amplitude and at least one first frequency of the first haptic atom at a first time, and the second information point indicates a second amplitude and at least one second frequency of the first haptic atom at a second time, and wherein the first information is associated with a user experience; and
a processing circuitry configured to, responsive to receiving an indication of occurrence of the user experience:
generate the haptic signal based on the first information such that the haptic signal comprises the first haptic atom having the first amplitude and the at least one first frequency at the first time, and the second amplitude and the second frequency at the second time; and
output the haptic signal comprising the first haptic atom to the haptic transducer.

25. The haptic signal generator of claim 24 wherein the first time is defined relative to a start time of the first haptic atom.

26. The haptic signal generator of claim 24 wherein the second time is defined relative to the first time.

27. The haptic signal generator of claim 24 wherein the processing circuitry is further configured to:
generate the haptic signal such that an amplitude of the first haptic atom increases from the first amplitude to the second amplitude between the first time and the second time.

28. The haptic signal generator of claim 24 wherein the processing circuitry is further configured to:
generate the haptic signal such that a frequency of the first haptic atom increases from the first frequency to the second frequency between the first time and the second time.

29. The haptic signal generator of claim 24 wherein the first information further comprises a repetition time.

30. The haptic signal generator of claim 29 wherein the processing circuitry is further configured to:
generate the haptic signal such that the first haptic atom is repeated after the repetition time.

31. The haptic signal generator of claim 29 wherein the first information further comprises an indication of a number, X, of repetitions, where X is an integer value, and the processing circuitry is further configured to:
  generate the haptic signal such that the part of the haptic signal is repeated X times at intervals of the repetition time.

32. The haptic signal generator of claim 24 wherein the first haptic atom comprises a part of the haptic signal.

33. The haptic signal generator of claim 24 wherein information for reconstruction of a plurality of haptic atoms is stored associated with the user experience; wherein the processing circuitry is further configured to:
  responsive to receiving the indication of occurrence of the user experience, generate the haptic signal based information for reconstruction of a plurality of haptic atoms such that the haptic signal comprises a sequence of haptic atoms.

34. The haptic signal generator of claim 24 wherein the user experience comprises a button press by a user.

35. The haptic signal generator of claim 24 wherein the user experience comprises a sensory event output to a user.

36. A haptic signal generator for generating a haptic signal for output to a haptic transducer, the haptic signal generator comprising processing circuitry configured to:
  responsive to receiving an indication of occurrence of a user experience, retrieving stored representations of a plurality of haptic atoms, wherein the stored representations are stored associated with the user experience; and
  generate, based on the stored representations, the haptic signal such that the haptic signal comprises a sequence of the plurality of haptic atoms; and
  outputting the haptic signal to the haptic transducer.

37. The haptic signal generator of claim 36 wherein the processing circuitry is further configured to generate the haptic signal such that two of the plurality of haptic atoms are separated by a desired wait.

38. The haptic signal generator of claim 36 wherein at least one of the stored representations comprises a pulse code modulation of one of the plurality of haptic atoms.

39. The haptic signal generator of claim 36 wherein at least one of the stored representations comprises a first information point indicating a first amplitude and at least one first frequency of the first part of one of the plurality of haptic atoms at a first time.

40. The haptic signal generator of claim 36 wherein the processing circuitry is further configured to receive an audio signal for output to a speaker; wherein the indication of occurrence of the user experience comprises the processing circuitry detecting the user experience in the audio signal.

41. The haptic signal generator of claim 36 wherein the stored representations are stored associated with the user experience as part of a stored code associated with the user experience.

42. The haptic signal generator of claim 41 wherein the stored code comprises:
  an indication of a first stored representation of a first haptic atom;
  an indication of a second stored representation of a second haptic atom; and
  an indication of a time to elapse between the first haptic atom and the second haptic atom.

43. The haptic signal generator as claimed in claim 42 wherein the stored code further comprises an indication of an amplitude to playback the first haptic atom.

44. The haptic signal generator of claim 36 wherein the plurality of haptic atoms each comprise a part of the haptic signal.

45. The haptic signal generator of claim 36 wherein the user experience comprises a button press by a user.

46. The haptic signal generator of claim 36 wherein the user experience comprises a sensory event output to a user.

47. A method for outputting a haptic signal to a haptic transducer, the method comprising:
  storing a piece wise linear envelope, PWLE, of a haptic atom, wherein the PWLE is stored associated with a user experience;
  responsive to receiving an indication of occurrence of the user experience, generating the haptic signal based on the PWLE such that the haptic signal comprises the haptic atom; and
  outputting the haptic signal to the haptic transducer.

48. A haptic signal generator for generating a haptic signal for output to a haptic transducer, the haptic signal generator comprising processing circuitry configured to:
  store a piece wise linear envelope, PWLE, of a haptic atom, wherein the PWLE is stored associated with a user experience;
  responsive to receiving an indication of occurrence of the user experience, generate the haptic signal based on the PWLE such that the haptic signal comprises the haptic atom; and
  output the haptic signal to the haptic transducer.

\* \* \* \* \*